United States Patent Office 2,719,776
Patented Oct. 4, 1955

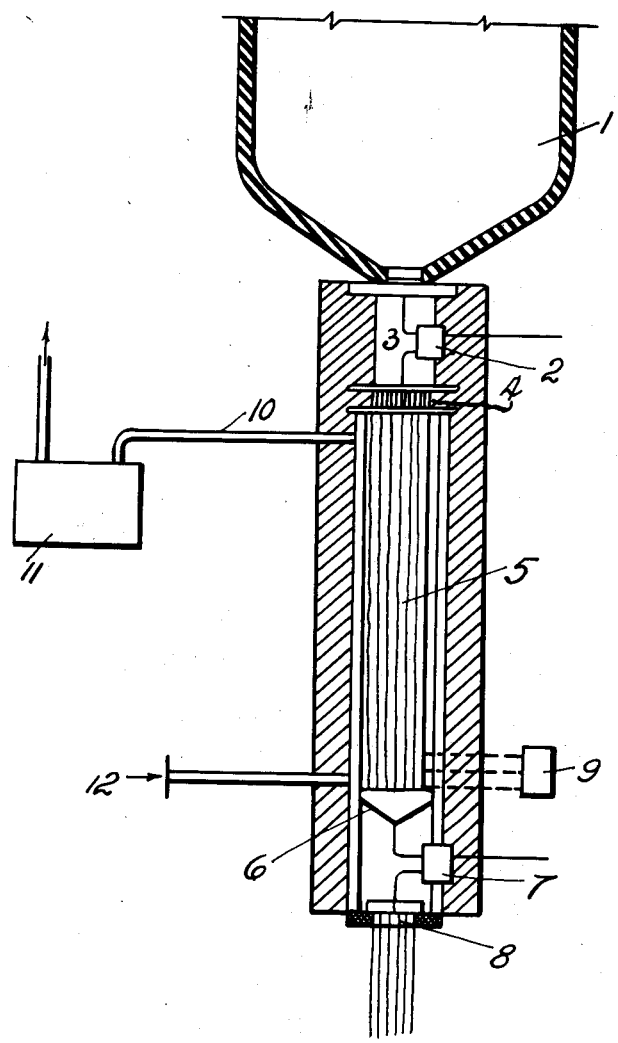

2,719,776

ELIMINATION OF MONOMERS FROM LACTAM-POLYMERIZATION PRODUCTS

Paul Kümmel, Ems, Switzerland, assignor to Inventa A.-G. für Forschung und Patentverwertung Luzern, Lucerne, Switzerland Application August 11, 1950, Serial No. 178,787

2 Claims. (Cl. 18—54)

This invention relates to improvements in the art of molten flux spinning and more particularly to a new method for the elimination of monomers from lactam-polymerization products.

It is a fact well known to those skilled in the art that no complete polymerization of monomer lactams with more than 6 ring members is to be achieved. The reaction terminates rather in an equilibrium comprising smaller or larger proportions of the monomer starting materials.

Starting for instance with $\epsilon$-aminocaprolactam one obtains in the final stage of polymerization a mixture of about 90% high polymers with about 10% monomer, dimer, etc. lactams.

For shifting the equilibrium noticeably to the high polymer side, it has been suggested to alter the polymerization conditions, this however without any substantial success.

The elimination of the much too high proportion of monomers in lactam-polymerization products, however, is of highest importance because by their presence the spinning process is unfavorably influenced and the strength of the finished silk or fibres or bristles is reduced.

In order to avoid these disadvantages two different methods are now used in production, i. e. evacuation of the reaction vessel after termination of polymerization in the flux, or water extraction of solid polyamids (shavings).

In the latter case the monomer content can be reduced to about 1% which is very difficult by evacuation especially since lengthy continuation of the flux in liquid form results in continuous reversion to monomers.

A reversion to monomers also takes place when melting shavings with a 1% extract content as is the case in spinning, dependent on the length of time the flux remains in the spinning head.

In the case of very small pump output occurring with fine titres, the reversion to monomers may increase to about 7%, but with coarse titres and correspondingly high pump output to about 3.5 to 4%. Neither by the tiresome process of watery extraction nor by evacuation of the polymerization reaction vessel does one achieve the desideratum: a polymerization flux which, directly before the nozzle, is to a large extent free of monomers and facilitates the spinning process and also a spun product with a minimum monomer content.

From an economic point of view these conditions are very unfavorable. For instance: in the case of high polymer $\epsilon$-aminocaprolactams hitherto extensively employed in manufacture, about 9% of monomers must be removed by extraction of which about 90% can be recovered by distillation of the extraction water. When melting in the spinning apparatus, a reversion of on the average 5% occurs which must be eliminated from the spun silk to at least 2% by washing whereby 3% are lost as the processing of the washwater is not worth while. About ¾% are lost as spinning fumes so that the effective loss amounts to 4% in round numbers, plus the costs for processing the extraction water of the shavings and the losses arising hereby.

It is an object of this invention to eliminate these disadvantages to avoid extensively the loss of monomers whereby both the polyamid flux and the threads or bristles exhibit a considerably lower monomer content than heretofore and whereby the eliminated monomers may be recovered in a simple manner.

This and other objects of this invention will become apparent from the following specification and accompanying schematical drawing which shows a vertical section through a device adapted to carry out the present invention.

Referring in detail to the drawing, sump 1 contains the polyamid flux which may be supplied directly from the reaction vessel or mixed from a plurality of same.

The flux is sprayed by means of pump 2 through the pump block 3 out of the auxiliary nozzle 4. This is a sort of spinning nozzle with a plurality of bores, the number depending on the projected pump output.

The purpose of this auxiliary nozzle is to impart to the polyamid flux pressed through it as great a surface as possible in the form of threads which should still be in molten flux in order that from them, when falling through pipe 5, the excess monomers evaporate. This evaporation can be accelerated by applying a vacuum and/or introducing an inert gas, preferably by introducing slight amounts of oxygen-free nitrogen through pipe 12. The monomers distilled off through pipe 10 are collected in chamber 11.

Pipe 5 is a double jacket pipe kept at a temperature such that on the one hand the monomers distilled off do not condense on it and on the other hand the threads ending in sump 6 are still in a state of liquid flux. Sumps 1 and 6 including pump 2 are likewise heated by a heating jackets whose task is to supply the flux with as much warmth as corresponds to the loss of heat through the heat of vaporization of the monomers. Sump 6 is kept so small that the flux remains in it only long enough to be sufficiently de-gasified, whereby the reversion to monomers is kept at a minimum.

Sump level 6 is automatically regulated at various heights by one or more measuring contacts 9.

The control of the sump level can take place thermo-electrically or by means of conductivity measurements whereby the impulse is transmitted to the drive of pump 2 which is then driven correspondingly slower or faster whereby its output changes.

From sump 6 spinning takes place in the usual manner by means of spinning pump 7 through nozzle 8.

It is found that the spinning proceeds more quietly than heretofore due to the fact that the tendency of the threads issuing from the spinning nozzle to frill is considerably lower.

I claim:

1. The process of spinning a polyamide derived from lactam polymerization, which comprises passing a fluid mass of said polyamide in a multiplicity of continuous streams through a vessel, maintaining in said vessel an elevated temperature whereby monomer in equilibrium with said polyamide is evaporated continuously, withdrawing vapor from said vessel whereby said monomer is withdrawn, momentarily collecting said streams in a liquid pool, and spinning a solid filament of said polyamide substantially immediately thereafter and before substantial reversion to monomer has occurred.

2. The process of spinning a polyamide derived from lactam polymerization, which comprises passing a fluid mass of said polyamide in a multiplicity of continuous streams through a vessel, maintaining in said vessel an elevated temperature whereby monomer in equilibrium with said polyamide is evaporated, passing a stream of nitrogen through said vessel countercurrent to said streams whereby said vaporized monomer is withdrawn, momentarily collecting said streams in a liquid pool, and spinning a solid filament of said polyamide substantially immediately thereafter and before substantial reversion to monomer has occurred.

References Cited in the file of this patent

UNITED STATES PATENTS

| | | |
|---|---|---|
| 2,146,532 | Crane et al. | Feb. 7, 1939 |
| 2,241,321 | Schlack | May 6, 1941 |
| 2,253,176 | Graves | Aug. 19, 1941 |
| 2,323,383 | Dreyfus | July 6, 1943 |
| 2,508,462 | Marshall | May 23, 1950 |